United States Patent [19]

Duling et al.

[11] 3,717,534
[45] Feb. 20, 1973

[54] METHOD FOR PREPARING LAMINATED ARTICLE OF CELLULOSIC AND POLYMERIC LAYERS

[75] Inventors: Irl N. Duling, West Chester; John C. Merges, Jr., Glen Mills, both of Pa.

[73] Assignee: Sun Oil Company, Philadelphia, Pa.

[22] Filed: Aug. 6, 1970

[21] Appl. No.: 61,719

[52] U.S. Cl. .................. 156/309, 156/61, 156/285, 156/313, 161/229, 161/235, 264/45, 264/261
[51] Int. Cl. .................................................. C05j 7/04
[58] Field of Search ...... 156/169, 228, 235, 285, 307, 156/309, 311, 326, 61; 106/38.25, 230, 231; 264/45–48, 111, 261; 161/214, 220, 223, 228, 229, 234, 235

[56] References Cited

UNITED STATES PATENTS

| | | | |
|---|---|---|---|
| 2,514,979 | 7/1950 | Turner et al. | 161/223 X |
| 2,610,939 | 9/1952 | Fisher et al. | 156/326 X |
| 3,172,801 | 3/1965 | Cantelow | 161/223 X |
| 3,373,915 | 3/1968 | Anderson et al. | 161/223 X |
| 3,553,074 | 1/1971 | Knepp | 161/220 X |
| 3,560,324 | 2/1971 | Quackenbush | 156/309 X |
| 3,561,994 | 2/1971 | Dwyre | 161/235 X |

*Primary Examiner*—Carl D. Quarforth
*Assistant Examiner*—P. A. Nelson
*Attorney*—George L. Church, Donald R. Johnson and Wilmer E. McCorquodale, Jr.

[57] ABSTRACT

A tri-layer laminated article, having utility as a packaging material, is prepared by forming an inner layer of a dispersion of solid polymer particles in molten wax adjacent to and between two outer cellulosic layers. The subsequent application of heat and pressure to the resulting composite causes the wax to impregnate the cellulosic material while the polymer particles form a molten middle layer. Upon cooling the polymer solidifies resulting in an article having two outer cellulosic layers of which at least one is wax impregnated and a middle polymeric layer. Said polymer is insoluble in molten wax at a temperature below the polymer's melting point and has a melting point between the melting point of the wax and 300°C.

5 Claims, 4 Drawing Figures

SECTION "A-A"

PATENTED FEB 20 1973 3,717,534
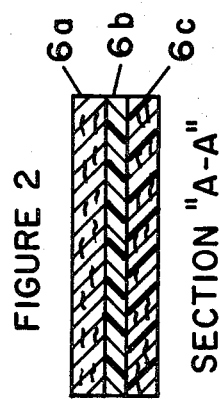
FIGURE 2 SECTION "A-A"
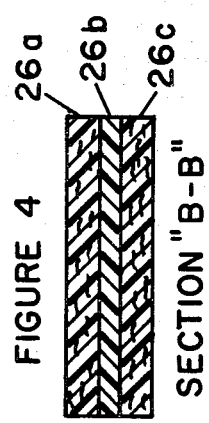
FIGURE 4 SECTION "B-B"
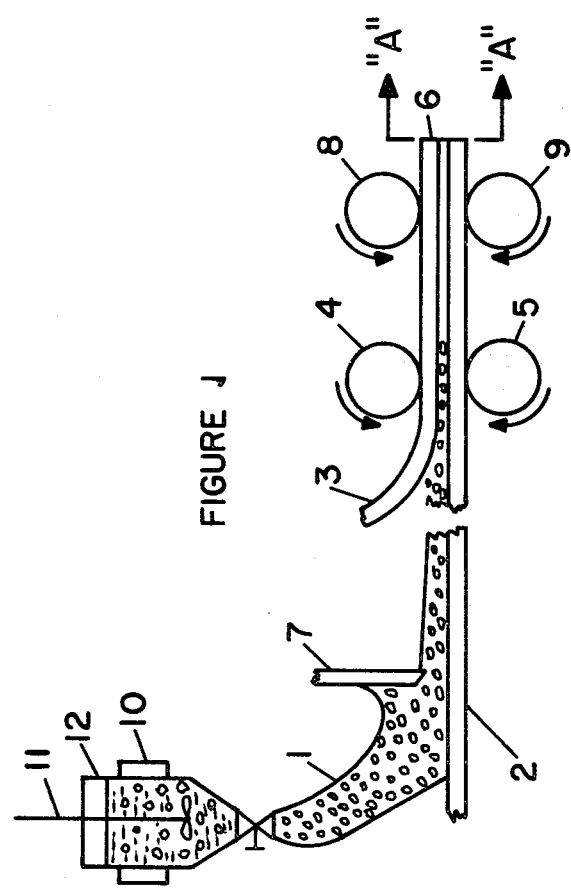
FIGURE 1
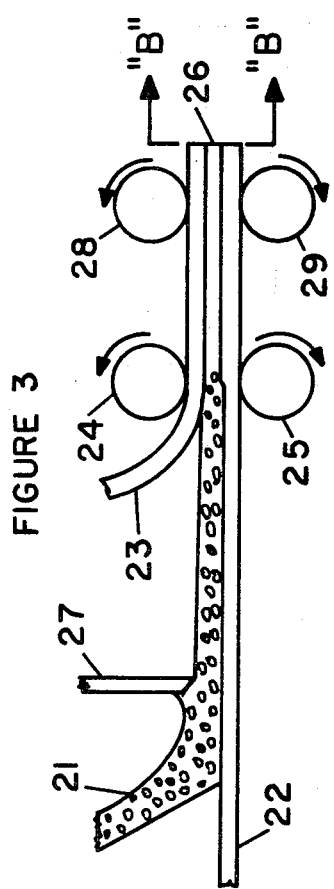
FIGURE 3
INVENTORS
IRL N. DULING
JOHN C. MERGES JR.
BY W.E. McCorquodale, Jr.
ATTORNEY

METHOD FOR PREPARING LAMINATED ARTICLE OF CELLULOSIC AND POLYMERIC LAYERS

CROSS REFERENCES TO RELATES APPLICATIONS

The present application is copending with the following application filed same date herewith, Ser. No. 61,718, E. P. Black, I. N. Duling, J. C. Merges, Jr. and A. F. Talbot, "Method for Preparing Laminated Article of Metallic, Polymeric and Wax Impregnated Cellulosic Layers". Also, the present application is related to application Ser. No. 884,847 filed Dec. 15, 1969 by I. N. Duling and J. C. Merges which describes a method for preparing a polymer coated, wax impregnated cellulosic substrate. All these applications are of common ownership.

BACKGROUND OF THE INVENTION

The present invention provides a method for preparing a tri-layer laminated article having two outer cellulosic layers and a middle thermoplastic polymeric layer. One of the outer cellulosic layers is wax impregnated. The other outer cellulosic layer is or is not wax impregnated depending on when it contacts the polymeric material and/or on whether this layer is porous or nonporous. The middle polymeric layer contributes to the barrier properties of the final laminated article and is an adhesive. This article has utility as a superior packaging material.

The aforementioned parent application Ser. No. 884,847 filed Dec. 15, 1969 describes a method for wax impregnating porous cellulosic stock while being coated with a thermoplastic polymer coating. In the method described therein, a dispersion of polymer particles in molten wax is applied to cellulosic stock at a temperature below the melting point of the polymer. The subsequent application of heat, sufficient to melt the polymer and pressure results in a polymer coated, wax impregnated cellulosic stock.

In the present application an additional step is incorporated. The placing of another cellulosic layer adjacent to the polymer particles prior to the application of heat and pressure, results in a tri-layer laminated article of two outer cellulosic layers and an inner polymeric layer. One of the cellulosic layers of said article is wax impregnated whereas the other outer layer can be one of the following: a wax impregnated cellulosic layer, a nonporous cellulosic layer or a porous cellulosic layer which is not wax impregnated.

SUMMARY OF THE INVENTION

A tri-layer laminated article can be easily prepared by this invention, said article having one outer wax impregnated cellulosic layer, a middle layer of thermoplastic polymer and the other outer cellulosic layer. The latter, if porous, can be either wax impregnated or not wax impregnated. Also, the other outer cellulosic layer can be nonporous and, therefore, not wax impregnated. In this invention a dispersion of solid polymer particles in molten wax, maintained at a temperature below the melting point of the polymer, is applied as a coating to a surface of at least one of the cellulosic layers. The other cellulosic layer, i.e., the layer to which the dispersion was not applied, is brought into contact with the dispersion and then heat and pressure are applied. As a result, substantially all the molten wax is absorbed by one or both of the cellulosic layers whereas the polymer particles melt and form a molten middle layer. Upon cooling, the molten polymer solidifies and the tri-layer laminated article is formed.

The thermoplastic polymer used in the aforementioned invention is substantially insoluble in molten wax at a temperature below the polymer's melting point and has a melting point between the melting point of the wax and about 300°C.

BRIEF DESCRIPTION OF THE DRAWING

FIGS. 1 and 3 schematically illustrate two methods of forming the tri-layer laminated article in accordance with the present invention.

FIGS. 2 and 4 are two cross-sectional views of finished laminated products made by the methods described in FIGS. 1 and 3.

DESCRIPTION OF THE INVENTION

One method of preparing a tri-layer laminated article according to this invention is illustrated in FIG. 1. To prepare the dispersion 1, thermoplastic polymer particles and the solid wax are placed in a suitable container 12. The temperature of the polymer and wax in the container is raised to above the melting point of the wax but below the melting point of the polymer by a suitable heater 10. This temperature is maintained throughout the application step. After the wax melts, sufficient agitation is applied by a conventional mixer 11 to keep the finely divided polymer uniformly distributed throughout the molten wax. The dispersion, which is a heterogeneous composite of thermoplastic polymer in finely divided form and molten wax, is transferred to a porous cellulosic layer 2 from a container 12. The doctor blade 7 insures that a uniformly thick layer is deposited on the moving layer 2. When the dispersion 1 contacts the porous cellulosic layer 2, the absorption of the molten wax begins. Before the second porous cellulosic layer 3 contacts the polymer particles, sufficient time elapses so that substantially all the wax in the dispersion 1 is absorbed by the porous cellulosic layer 2. After the second porous cellulosic layer 3 contacts the polymer particles, rollers 4 and 5 apply heat and pressure to the resulting composite. The heat causes the polymer particles to melt while the pressure spreads the molten particles into one essentially continuous layer. Afterwards the article is cooled by conventional means such as cold rolls 8 and 9, causing the molten polymer to solidify.

FIG. 2 is a cross-sectional view of the finished article 6 prepared by the aforementioned described method. The outer layer 6c represents the porous cellulosic layer 2 now impregnated with wax from the wax polymer dispersion 1. The middle layer 6b is essentially a continuous polymer layer, the polymer being from the wax-polymer dispersion 1. Because substantially all of the wax is absorbed by the porous cellulosic layer and the polymer is insoluble in the molten wax, the polymeric layer 6b is substantially all polymer. The polymeric layer 6b is continuous in that it contributes to the total barrier properties of the finished article despite the possible existence of pinholes. Pinholes are extremely small holes that even occasionally appear in extruded thermoplastic polymer films. The inner polymer layer 6b also binds the two outer layers, 6a and 6c, together. The outer layer 6a represents the porous cellulosic layer 3 substantially free of wax or polymer. While layer 6a is substantially free of polymer, sufficient polymer entangles itself with the surface fibers of the cellulosic layer to provide the desired bond between the polymeric and cellulosic layers.

Another method of preparing a tri-layer laminated article according to this invention is illustrated in part in FIG. 3. The dispersion 21, having been prepared as described in the discussion relating to FIG. 1, is transferred to a moving porous cellulosic layer 22. The dispersion 21, with the finely divided polymer uniformly distributed through the molten wax and with its temperature maintained below the melting point of the polymer, is spread in an even thickness by the doctor blade 27 across the layer 22. The second cellulosic layer 23, being either porous or nonporous, contacts the dispersion shortly after the dispersion is applied to layer 22. Thus the cellulosic layer 23, if porous, and layer 22 absorb substantially all the wax in the dispersion 21. If cellulosic layer 23 is nonporous, it absorbs substantially no wax. After the second layer 23 contacts the dispersion, rollers 24 and 25 apply heat and pressure to the resulting composite. The heat causes the polymer particles to melt while the pressure spreads the molten particles into essentially one continuous layer and forces some of it into the cellulosic layers. Afterwards, the article is cooled by conventional means, such as cold rolls 28 and 29, causing the molten polymer to solidify.

FIG. 4 is a cross-sectional view of the finished article 26 prepared as described in the discussion relating to FIG. 3. The outer layer 26c represents the porous cellulosic layer 22 now impregnated with wax from the wax polymer dispersion 21. The inner layer 26b is essentially a continuous polymeric layer, the polymer being from the wax-polymer dispersion 21. Because substantially all the wax is absorbed by the cellulosic layers, i.e., 26c and 26a if porous, polymeric layer 26b is substantially all polymer. The polymeric layer 26b is continuous in that it contributes to the total barrier properties of the finished article, despite the possible existence of pinholes. The polymeric layer 26b also firmly adheres to the two outer layers, 26a and 26c.

In practicing this invention, at least one porous cellulosic layer must be able to absorb wax at a reasonable rate. Thus the porous cellulosic layer which will be impregnated with wax cannot be already coated with a substance or impregnated with a substance which would substantially slow down the wax impregnation rate. Typical wax absorption times for coated and uncoated cellulosic materials are shown in the following Table I.

TABLE I

Wax Absorption Time of Various Cellulosic Materials

| Material[2] | Thickness, mils | Surface Coating | Wax absorption Time, minutes[1] |
|---|---|---|---|
| Kraft liner board | 8.5 | No | 1 |
| Corrugated board | 10 | " | 1 |
| Cup board | 14 | " | 3.5 |
| Chip board | 33 | " | 0.5 |
| Oil can cardboard | 26 | " | 0.5 |
| Freezer carbon | | | |
| Regular density | 10 | " | 3 |
| Medium density | 18 | " | 0.5 |
| Paper plate | 20 | " | 1.5 |
| " " | 20 | " | 3 to 4 |
| Oil can cardboard | 26 | Yes | 6 to 10 |
| " " | 28 | Yes and printed | 50 to 70 |
| Freezer carton | | | |
| Regular density | 10 | Yes | 35 |
| Medium density | 18 | " | 20 to 22.5 |
| Bread wrapper | 2.5 | — | >12 |
| Glassine paper | 1.33 | — | >100 |

[1] Time required for a 0.1 ml. drop of wax to be absorbed into a test sheet at 160°F.
[2] These materials are defined in THE DICTIONARY OF PAPER, 3rd Edition, American Paper and Pulp Association, 1965.

Kraft liner board, with a wax absorption time of 1 minute as shown in Table I, is a preferred porous cellulosic layer to be impregnated with wax. The medium density freezer carton material, with wax absorption time of 20 to 22.5 minutes, is not a preferred porous cellulosic layer to be impregnated with wax.

The difference between porous and nonporous cellulosic material is illustrated by the data shown in Table I. Thus Kraft liner board, with a wax absorption time of 1 minute, is an example of a porous cellulosic layer, whereas, glassine paper with a wax absorption time in excess of 100 minutes, i.e., the test is stopped after 100 minutes, is an example of nonporous cellulosic material. Glassine paper is an example of a preferred nonporous cellulosic material.

The pulp used to make the various cellulosic layers that can be used in this invention can be derived from a suitable source such as wood, reclaimed paper, cotton fibers and others fibers such as manila hemp, jute, etc.

The wax used herein can be a petroleum wax obtained by any one of the processes described in Chapter 5 of THE CHEMISTRY AND TECHNOLOGY OF WAXES by A. H. Warth, 2nd Edition and can be any one of the refined or unrefined petroleum waxes described in the same chapter. Synthetic waxes that can be used are described in Chapter 6 of the aforementioned reference.

Petroleum wax is commercially available with a wide range of physical properties. Paraffin waxes are available with melting points from about 126°F. to 153°F. (ASTM D87), oil contents from about 0.1 to about 1.2 percent (ASTM D721), penetration at 77°F. from about 9 to 40 (ASTM D1321), specific gravity at 212°F. from about 0.756 to 0.767 (ASTM D287). Microcrystalline waxes are available with melting points from about 151°F. to 193°F. (ASTM D127), oil contents from about 0.4 to about 1.5 percent (ASTM D721), and specific gravity at 212°F. from about 0.786 to 0.795 (ASTM D287). While these different petroleum waxes will be absorbed at different rates by various cellulosic stocks, our invention can be used with any petroleum wax fraction that will be absorbed by the stock.

If a thermoplastic polymer which is soluble in molten wax at a temperature below the melting point of the polymer is used with this invention the following problems arise. First if the polymer is soluble in the molten wax at a temperature below the melting point of the polymer, the viscosity of the resulting combination is drastically increased. This resulting high viscosity combination is very different to handle and to apply to the cellulosic layers. Furthermore, on contacting the stock the combination is absorbed by the layer. The remaining combination, after having pressure applied, forms a relatively weak polymer-wax barrier between the cellulosic layers. Weak means that the cellulosic layers can be easily separated from each other through the polymer-wax layer. Examples of thermoplastic polymers which are soluble in molten wax are the lower molecular weight polyethylenes and ethylene-vinyl-acetate copolymers. Thus to avoid the heretofore-mentioned problems, the thermoplastic polymers used with this invention are substantially insoluble in the molten wax at a temperature below the melting point of the polymer.

Examples of thermoplastic polymers which are substantially insoluble in the molten wax at a temperature below the melting point of the polymer are as follows: polyethylene with a molecular weight in excess of 1,000,000, isotactic polypropylene with a molecular weight in excess of 100,000, polystyrene, polycarbonate, polymethylmethacrylate, polyvinyl chloride, cellulose acetate butyrate, and certain polyamides. The polyamides which can be used with this invention are the aliphatic polyamides such as nylon-3, nylon-4, nylon-6, nylon-7, nylon-8, nylon-9, nylon-10, nylon-11, nylon-12, nylon-6,6 nylon-6,10 as well as copolymers such as nylon 6,6–6,10. Also the polyamide can be an aliphatic-aromatic polyamide such as nylon-6, T. However, all known all-aromatic polyamides, such as poly(meta-phenylenediamine isophthalamide), have melting points greater than 300°C. (572°F.) a temperature at which the discoloration of cellulosic material occurs and, therefore, should not be used in the present invention. The methods of preparing these polyamides as well as their physical and chemical properties are defined, in Kirk-Othmer, ENCYCLOPEDIA OF CHEMICAL TECHNOLOGY, Vol. 16, 2nd Edition, page 2.

The thermoplastic polymer used in this invention, when added to the wax, is in the form of finely divided particles. If the particles are too large, say passing through 3 mesh but remaining on 20 mesh, the resulting dispersion is unstable in that the particles settle out rapidly causing problems during the application of the dispersion to the layer. All references to mesh herein refer to U. S. Sieve Series. Even if this settling problem can be overcome, the resulting polymer coating on the stock is of non-uniform thickness and is not continuous; that is, there are some areas where there is no polymer coating. Thus while this invention is operable if all the polymer particles pass through a 20 mesh, it is preferable that all particles pass through 100 mesh and even more preferable that all particles pass through 200 mesh. Particles size distribution also influences dispersion stability and dispersion viscosity. At the same wax-polymer ratios a wide range particle distribution, compared to a narrow range particle distribution, tends to have a greater viscosity and hence greater stability. The limits as to particle size distribution range can be easily determined by those skilled in the art.

The weight ratio of the polymer to the wax used in this invention depends on dispersion stability and dispersion viscosity which in turn depends on polymer particle size and particle size distribution. Satisfactory weight ratios are 5 to 45 parts by weight of finely divided polymer and 55 to 95 parts by weight of wax; the preferred weight ratios are 10 to 40 parts by weight of finely divided polymer and 60 to 90 parts by weight of wax.

The preliminary step in practicing this invention is to prepare the dispersion. The solid wax is placed in a suitable container and heated until the wax becomes molten; but the resulting temperature should not exceed the melting point of the polymer being used. After the wax melts, the polymer is added; mild agitation is usually necessary to form the dispersion. Alternatively, both the solid wax and the polymer particles can be placed in a container and heated together to a temperature below the polymer's melting point. Immediately after the dispersion has been prepared it can be used or it can be cooled and the resulting solid used at a later time. The permissible temperature range used to prepare the dispersion depends on the melting point of the specific wax being used and the melting point of the specific polymer being used.

The dispersion, which is a heterogeneous composite of thermoplastic polymer in finely divided form and molten wax, is applied preferably to the surface of a porous cellulosic layer. The application of uniformly thick layer of dispersion to the layer can be obtained by using a doctor blade, or by extruding, e.g., curtain coating, or by a roll coater or some other suitable equipment. The amount of said heterogeneous composite being regulated so that substantially all the wax therein is absorbable in the pores of the cellulosic material.

After the forming of an inner layer of the dispersion adjacent to and between the two cellulosic layers, the inner layer is heated to a temperature above the melting point of the polymer while pressing the outer layers against the inner layer to form an essentially continuous middle molten layer. The application of this heat to raise the temperature of the polymer can precede the application of pressure by some finite time or can be simultaneous with the pressure. The amount of pressure applied depends on the type of polymer and ability of the stock to withstand the applied pressure without undesirable deformation. During this step, any wax remaining unabsorbed by the cellulosic material is absorbed into the cellulosic pores.

Subsequently, the article can be allowed to cool or can be cooled by a suitable heat removal device, e.g., cold rollers.

The following examples illustrate this invention:

EXAMPLES

To demonstrate that this method could be used with many thermoplastic polymers and different cellulosic stocks, the following runs were made. Seventy-five parts of petroleum wax were placed in a suitable container and the temperature of the wax was raised to above its melting point but below the melting point of the polymer to be added. To the molten wax 25 parts of the polymer were added. Gentle agitation maintained the polymer particles uniformly distributed in the wax. This dispersion was applied to cellulosic layer in the following manner. An oven was maintained at 160°F. In this oven was a roll of cellulosic material and several inches away was a doctor blade set to apply 2 to 5 mils of dispersion. The material moved from the mounted roll under the doctor blade and out of the oven. The molten wax-polymer dispersion was applied to the cellulosic layer between the roll and the doctor blade. Thus as the layer traveled under the doctor blade, a predetermined thickness of dispersion was applied. Note that the thickness must be limited to lay down no more wax component than can be absorbed by the cellulosic material. In these examples as the cellulosic layer left the oven much of the wax was absorbed by the layer because of the slowness at which the layer moved.

Another cellulosic layer was placed on the coated surface of the first cellulosic layer. The resulting assembly was placed between the platens of a press. The platen to be brought into immediate contact with the cellulosic layer last added was preheated to between 300°F. to 425°F., i.e., a temperature sufficient to fuse the specific polymer. The platens were closed loosely for a few seconds to heat the cellulosic layer and the polymer particles. The pressure was then raised to about 500 p.s.i. and maintained for a short time (about 10 sec.). The pressure was released and the assembly was removed from the press and cooled to about room temperature. The resulting product was a tri-layer laminated article having two outer cellulosic layers, one of which was wax impregnated, and an essentially continuous middle polymeric layer. The cellulose layers adhered firmly to the polymer as indicated by the peel strength data shown in Table II.

TABLE II

Polymers and Temperatures Used to Prepare Laminated Article

Porous Cellulosic-Polymer-Wax Impregnated Cellulosic Layers[e]

| Run | Polymer | melting point of polymer °F. | Fusion Temp. °F. | Peel Strength[f] lbs/3" width |
|---|---|---|---|---|
| 1 | Polyethylene[a] | 285 | 310 | Tear[d] |
| 2 | Polystyrene[b] | 250 | 310 | " |
| 3 | Polypropylene[c] | 330 | 350 | " |
| 4 | Polycarbonate | 350 | 400 | " |
| 5 | Nylon-11 | 376 | 410 | " |

(a) Molecular weight of 1,400,000
(b) Medium impact
(c) Molecular weight of 600,000, isotactic
(d) Tear refers to the separation occurring through a cellulosic layer rather than the polymeric layer.
(e) Both cellulosic layers were 125 lbs. per ream cupstock Same results obtained where both cellulosic layers were 185 lbs. per ream tubestock.
(f) Modified TAPPI–T806–SM46, dry test on 3" wide specimen at rate of 2"/min. and foil being pulled at 180°.

A tear seal indicates excellent bonding.

Also, tear seals were obtained when the polymer was the aforementioned polyethylene and the cellulosic layers were as follows: Kraft liner board to Kraft liner board, Kraft liner board to corrugating medium and Kraft liner board to bleached board.

Also, to demonstrate that this method could be used with a nonporous cellulosic layer, a tri-layer laminated article of glassine-nylon 11-wax impregnated bleached board as prepared in the aforementioned manner. With this article a tear seal was obtained.

The petroleum wax used in these examples had the following inspections:

| | |
|---|---|
| Melting point, ASTM D87 | 126°F. |
| Oil content, ASTM D721 | 0.4 |
| Color, Saybolt, ASTM D156 | +29 |
| Penetration at 77°F., ASTM D1321 | 18 |
| Viscosity, SUS at 210°F., ASTM D446 | 38.8 |
| Specific gravity at 212°F., ASTM D287 | 0.760 |

Other tri-layer articles can be prepared in the aforementioned manner using polymethylmethacrylate, cellulose acetate butyrate, polyvinyl chloride and the aliphatic and aliphatic-aromatic polyamides mentioned herein.

The invention claimed is:

1. Method of preparing a tri-layer laminated article having two outer cellulosic layers and a middle thermoplastic polymeric layer comprising:
   a. establishing a heterogeneous composite of thermoplastic polymer in finely divided form and molten wax, said polymer having a melting point between the melting point of the wax and 300°C., and being substantially insoluble in molten wax at a temperature below the melting point of the polymer;
   b. forming an inner layer of said heterogeneous composite adjacent to and between two cellulosic layers, at least one of said cellulosic layers being porous and the amount of said heterogeneous composite bein regulated so that substantially all wax therein is absorbable in pores of the cellulosic material and permitting sufficient time to elapse so that substantially all of the wax in said heterogeneous composite is separated from said polymer and absorbed into said porous cellulosic material and then;
   c. heating the inner layer to a temperature above the melting point of the polymer and pressing the outer layers against the inner layer to form an essentially continuous molten layer;
   d. and thereafter cooling the molten polymer whereby it solidifies resulting in said article having at least one cellulosic layer impregnated with wax.

2. A method according to claim 1 wherein said heterogeneous composite contains 5 to 45 parts by weight of finely divided polymer and 50 to 95 parts by weight of said wax.

3. A method according to claim 2 wherein all the finely divided polymer is finer than 100 mesh (U. S. Sieve Series).

4. A method according to claim 3 wherein the wax is a petroleum wax.

5. A method according to claim 4 wherein the polymer is selected from the following group: polyethylene with a molecular weight in excess of 1,000,000, isotactic polypropylene with a molecular weight in excess of 100,000, polystyrene, polycarbonate, polymethylmethacrylate, polyvinyl chloride, cellulose acetate butyrate, aliphatic polyamide and aliphatic-aromatic polyamide.

* * * * *